United States Patent

[11] 3,601,653

| | | |
|---|---|---|
| [72] | Inventor | Hans Golser<br>Munich, Germany |
| [21] | Appl. No. | 882,088 |
| [22] | Filed | Dec. 4, 1969 |
| [45] | Patented | Aug. 24, 1971 |
| [73] | Assignee | Siemens Aktiengesellschaft<br>Berlin and Munich, Germany |
| [32] | Priority | Feb. 4, 1969 |
| [33] | | Germany |
| [31] | | P 19 05 409.2 |

[54] GAS LASER WITH AUTOMATIC IGNITION
4 Claims, 1 Drawing Fig.

[52] U.S. Cl.............................................. 315/341,
315/227, 315/246
[51] Int. Cl............................................... H05b 41/16,
H01j 11/04
[50] Field of Search........................................... 315/100 V,
200, 227, 241, 245, 246, 341

[56] References Cited
UNITED STATES PATENTS
3,328,673  6/1967  Nuckolls ..................... 315/200 X
3,407,334  10/1968  Attewell ..................... 315/100 X Primary Examiner—Roy Lake
Assistant Examiner—Lawrence J. Dahl
Attorney—Hill, Sherman, Meroni, Gross & Simpson ABSTRACT: An automatic ignition circuit for a gas laser preferably one having a grounded DC discharge, wherein a voltage multiplier circuit is operatively connected at one end to the secondary winding of a power transformer, for the generation of the high ignition voltage, a relatively high resistance connected to the high voltage end of such circuit operative to connect such end to an electrode of the gas laser defining the discharge section, a relatively low resistance and a diode in series therewith operatively connected to an intermediate point of said multiplier, operative to connect such electrode to said intermediate point, such point being located to provide, during laser operation, a voltage corresponding approximately to the normal operating voltage whereby the high voltage end of said multiplier is operatively shunted to block said high voltage.

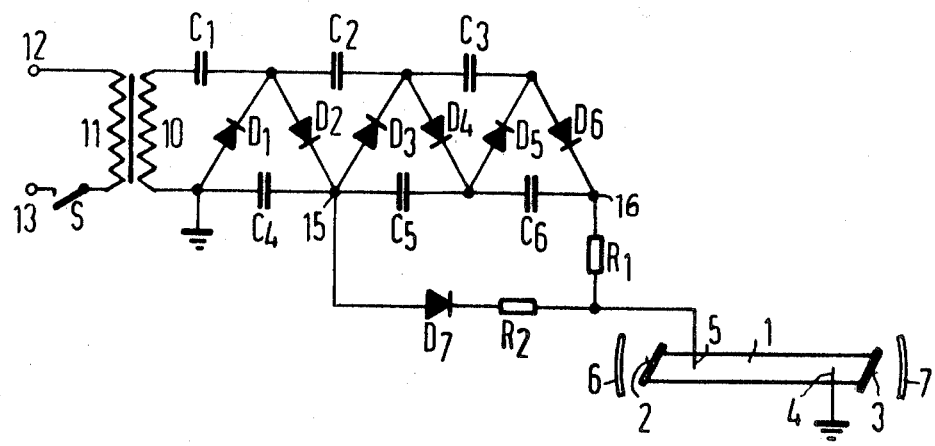

3,601,653

GAS LASER WITH AUTOMATIC IGNITION

BACKGROUND OF THE INVENTION

The present invention is directed to an automatic ignition circuit for a gas laser which, in operation, preferable has a grounded DC discharge.

Depending upon the type of gas and the gas pressure, the ignition voltage of a gas discharge may be substantially higher than the normal operating voltage. For example, in capillary tubes for He-Ne gas lasers, the ignition voltage may reach 4 to 5 times the value of the normal operating voltage. In such case, it would be extremely uneconomical to design the power supply unit with an output voltage corresponding to such high value and to derive the normal operating voltage therefrom by means of voltage dropping resistances or the like. In view thereof, the gas lasers operating with a DC discharge have often utilized a special ignition coil which effects ignition over an ignition wire wound about the capillary so that the output voltage of the power supply unit delivering the normal operating voltage of the DC discharge lies slightly above the normal operating voltage. In such case, the relatively low voltage drop from the power supply voltage to the normal operating voltage of the laser is derived by the use of suitable voltage dropping resistances.

However, where such a separate ignition circuit is employed, if contamination is present, or if the gas laser is employed in a humid atmosphere, the high tension ignition pulse can readily flash over from the ignition wire to ground whereby it is not possible to effect an ignition of the gas discharge. Separate and apart from these difficulties or disadvantages, such an arrangement obviously requires an ignition wire, an ignition coil and an arrester, which have no function at all throughout the normal operation of the gas laser, being operative only for the moment of ignition of the discharge.

The present invention therefore has among its objects the provision of a gas laser with automatic ignition which upon operative connection of the voltage automatically effects an ignition and then immediately provides a lower voltage corresponding to the normal operating voltage of the laser.

BRIEF SUMMARY OF THE INVENTION

The desired results are accomplished in the present invention in connection with a gas laser of the type initially described, in which a voltage multiplier circuit is provided for generating the high ignition voltage, the high voltage discharge end of such multiplier circuit being operatively connected to an electrode of the laser defining the discharge gap thereof, such connection being effected over a relatively high resistance. Such electrode is also adapted to be connected with a second point of the multiplier circuit (a normal operating voltage tap) which in operation provides a voltage corresponding approximately to the normal operating voltage of the discharge, with the high ignition voltage being blocked by the normal operating voltage.

Blockage of the ignition voltage with respect to the normal operating voltage is by suitable means which in the embodiment illustrated preferably comprises a diode connected in series with a relatively low resistance, which cooperably form the connecting means between the normal operating voltage tap and said electrode of the laser. The diode is so poled that it presents only a very slight resistance in forward direction from such tap to the laser electrode but blocks in the opposite direction from the high voltage end to the normal voltage tap and is cooperable with the two resistances to effect a very simple decoupling of the high and normal voltages.

The term "high resistance," as herein used is intended to designate a resistance which is substantially larger than the resistance of the operative firing section of the tube, i.e., the normal operating resistance of the tube, while the relatively low resistance is substantially lower than the high resistance and preferably is on the order of magnitude of such normal operating resistance of the tube.

The voltage multiplier circuit may be readily constructed in a simple manner as a Grinacher cascade which is operatively connected to the secondary winding of the transformer having a primary winding connected to an AC voltage source.

BRIEF DESCRIPTION OF THE DRAWINGS

The FIGURE of the drawing illustrates a schematic circuit embodying the present invention.

DETAILED DESCRIPTION OF THE INVENTION

The reference numeral 1 designates a gas filled discharge tube which is sealed by respective Brewsters windows 2 and 3 and contains two electrodes 4 and 5, of which the electrode 4 is grounded. The discharge tube is conventionally arranged between two reflectors, for example, mirrors 6 and 7, and the ungrounded electrode 5 is connected to the high voltage end of a Grinacher cascade comprising six capacitors C1 to C6 and six diodes D1 to D6, with such high voltage end being operatively connected to the electrode 5 by means of a relatively high resistance of, for example, 100M. The opposite end of the Grinacher cascade is connected to the secondary winding 10 of a transformer having a primary winding 11 adapted to be operatively connected, by means of a switch S, to the opposite sides 12 and 13 of an AC voltage source.

The electrode 5 is also connected to an intermediate point or tap 15 of the cascade by means of a relatively low resistance R2, for example, of 50KΩ, and a diode D7, connected in series therewith, such voltage tap being so selected that the voltage thereat is slightly larger than the normal operating voltage whereby the voltage dropping resistance R2 will apply the normal operating voltage to the electrode 5.

In operation, upon closure of the switch S and application of the AC voltage to the transformer primary winding 11, the initial resistance of the discharge section of the tube will initially be almost infinitely large whereby the high voltage can be fully built up at the high end point 16 of the cascade. As soon as the magnitude of such high voltage reaches that of the ignition voltage the discharge section will ignite, as a result of which its resistance will drop to a value which is substantially smaller than the value of the resistance R1. However, the high voltage at the end of the cascade, which breaks down upon ignition, cannot be rebuilt at this time, owing to the limited resistance of the discharge section as a result of current flow therein, whereby the shunt connection, represented by the diode D7 and resistance R2, practically short circuits the resistance R1 and the associated portion of the cascade disposed between such resistance and the tap 15. Consequently, only the normal operating voltage derived from the tap 15 will be delivered by the cascade to the electrode 5. The components of the cascade disposed ahead of the tap 15 and the resistance R2 are so dimensioned that, as previously mentioned, with a given AC voltage, the voltage drop appearing at the electrode 5 corresponds to the normal operating voltage of the tube.

While only a preferred form of the invention has been illustrated and described, it will be apparent that various modifications may be made in the invention without departing from the spirit and scope of the novel concepts thereof. For example, the function of the diode D7 could be performed by another electrical component or components having directional forward characteristics to effect a blocking of the voltage from the high end 16 of the cascade. Likewise the cascade can employ any suitable circuit and may require any desired number of stages in dependence on the requisite voltages.

Likewise other changes and modifications may be made by those skilled in the art without departing from the spirit and scope of the novel concepts of the invention.

I claim as my invention:

1. An automatic ignition circuit for a gas laser preferably one having a grounded DC discharge, comprising a voltage multiplier circuit adapted to be operatively connected at one end of a power source, for the generation of the high ignition voltage, a relatively high resistance connected to the high voltage end of said circuit operative to connect such end to an electrode of such gas laser defining the discharge section, and means having a relatively low operating resistance operatively connected to an intermediate point of said multiplier, operative to connect such electrode to said intermediate point, such point being located to provide, during laser operation, a voltage corresponding approximately to the normal operating voltage whereby the high voltage end of said multiplier is operatively shunted to block said high voltage.

2. An automatic ignition circuit for a gas laser according to claim 1, wherein said means comprises a diode in series with a relatively low resistance.

3. An automatic ignition circuit for a gas laser according to claim 1, wherein said power source comprises a transformer having a primary winding adapted to be connected over a switch to an AC voltage source, and having a secondary winding to which said multiplier circuit is operatively connected.

4. An automatic ignition circuit for a gas laser according to claim 2, wherein said power source comprises a transformer having a primary winding adapted to be connected over a switch to an AC voltage source, and having a secondary winding to which said multiplier circuit is operatively connected.